United States Patent
Ramakrishnan et al.

(10) Patent No.: US 10,186,291 B1
(45) Date of Patent: Jan. 22, 2019

(54) BOND PAD SHARING IN HEAD SLIDER USING NULL POINT CENTER TAP

(71) Applicant: Seagate Technology LLC, Cupertino, CA (US)

(72) Inventors: Narayanan Ramakrishnan, Eden Prairie, MN (US); Jon Karsten Klarqvist, Roseville, MN (US); James G. Wessel, Savage, MN (US); Declan Macken, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/603,730

(22) Filed: May 24, 2017

Related U.S. Application Data

(60) Provisional application No. 62/341,805, filed on May 26, 2016.

(51) Int. Cl.
G11B 5/48 (2006.01)
G11B 5/60 (2006.01)
G11B 5/31 (2006.01)

(52) U.S. Cl.
CPC ............ G11B 5/607 (2013.01); G11B 5/3169 (2013.01); G11B 5/4853 (2013.01)

(58) Field of Classification Search
CPC .................................................. G11B 5/4853
USPC ...................................................... 360/234.5
See application file for complete search history.

(56) References Cited

U.S. PATENT DOCUMENTS

| | | | |
|---|---|---|---|
| 6,347,983 B1 | 2/2002 | Hao et al. | |
| 7,014,530 B2 | 3/2006 | Kasiraj et al. | |
| 7,256,957 B1 * | 8/2007 | Rahgozar | G11B 5/6005 360/31 |
| 7,426,089 B2 | 9/2008 | Wada et al. | |
| 7,589,928 B2 | 9/2009 | Roy et al. | |
| 8,879,189 B2 | 11/2014 | Miyamoto et al. | |
| 9,095,951 B2 | 8/2015 | Gee et al. | |
| 9,607,641 B1 * | 3/2017 | Ramakrishnan | G11B 5/607 |
| 9,812,158 B1 * | 11/2017 | Ramakrishnan | G11B 5/4853 |
| 9,824,705 B1 * | 11/2017 | Macken | G11B 5/4853 |
| 9,905,254 B1 * | 2/2018 | Ramakrishnan | G11B 5/4853 |
| 9,905,255 B1 * | 2/2018 | Ramakrishnan | G11B 5/4853 |
| 2005/0088772 A1 * | 4/2005 | Baumgart | G11B 5/6005 360/75 |
| 2006/0023331 A1 * | 2/2006 | Flechsig | G11B 5/314 360/61 |
| 2007/0177305 A1 * | 8/2007 | Araki | G11B 5/3166 360/234.5 |

(Continued)

Primary Examiner — Jefferson Evans
(74) Attorney, Agent, or Firm — Kagan Binder, PLLC

(57) ABSTRACT

A head slider for use in a disk drive is movably positionable relative to a magnetic recording disk and includes at least one write element for writing data to the magnetic recording disk. The write element includes a writer coil electrically connected between a first bond pad and a second bond pad, where the connection between the first bond pad and the second bond pad includes a center tap located proximate to a voltage null point. The head slider also includes at least one read element for reading data from the magnetic recording disk, the read element electrically connected between the center tap and a third bond pad, where the write element and the read element are configured to be selectively activated based on biased inputs to the first bond pad, the second bond pad, and the third bond pad.

20 Claims, 7 Drawing Sheets

(56) References Cited

U.S. PATENT DOCUMENTS

| | | | |
|---|---|---|---|
| 2007/0230056 A1 | 10/2007 | Beach et al. | |
| 2007/0258171 A1* | 11/2007 | Ohtsu | G11B 5/314 |
| | | | 360/326 |
| 2008/0074797 A1* | 3/2008 | Ikai | G11B 5/4853 |
| | | | 360/294.4 |
| 2008/0170326 A1* | 7/2008 | Feng | G11B 5/4853 |
| | | | 360/99.04 |
| 2010/0142096 A1* | 6/2010 | Contreras | G11B 5/6011 |
| | | | 360/245.8 |
| 2011/0019311 A1* | 1/2011 | Greminger | G11B 5/4853 |
| | | | 360/234.5 |
| 2012/0327529 A1* | 12/2012 | Hutchinson | G11B 5/6005 |
| | | | 360/31 |
| 2014/0269838 A1* | 9/2014 | Macken | G11B 5/607 |
| | | | 374/183 |
| 2015/0103430 A1* | 4/2015 | Gadbois | G11B 5/4853 |
| | | | 360/59 |
| 2015/0103443 A1 | 4/2015 | O'Konski et al. | |
| 2015/0162038 A1* | 6/2015 | Macken | G11B 5/607 |
| | | | 360/75 |
| 2016/0163343 A1* | 6/2016 | Olson | G11B 5/6094 |
| | | | 360/234.5 |
| 2016/0284372 A1* | 9/2016 | Duda | G11B 5/314 |
| 2017/0032810 A1* | 2/2017 | Macken | G11B 5/4853 |

* cited by examiner

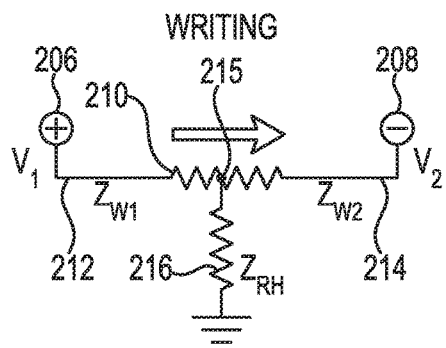
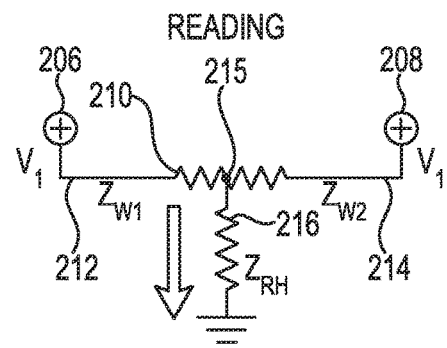
Fig. 2A          Fig. 2B
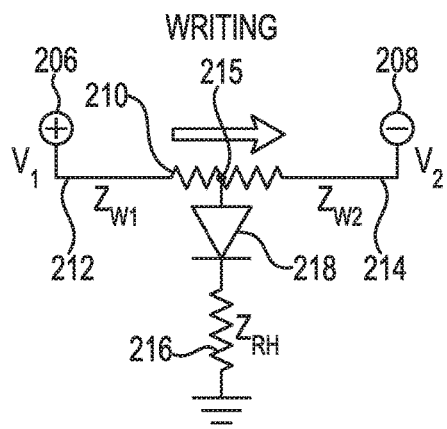
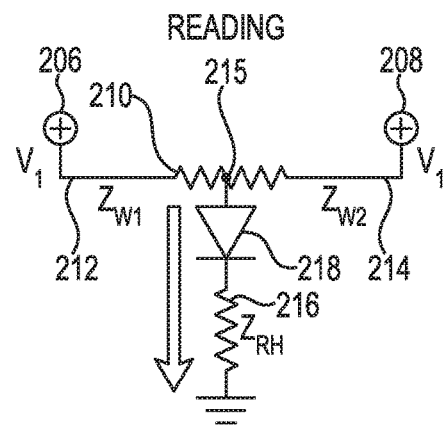
Fig. 3A          Fig. 3B

BOND PAD SHARING IN HEAD SLIDER USING NULL POINT CENTER TAP

CROSS-REFERENCE TO RELATED APPLICATIONS

This application claims the benefit of U.S. Provisional Patent Application No. 62/341,805, filed May 26, 2016, the entire contents of which are incorporated herein by reference in its entirety.

BACKGROUND

The present invention is directed to the fabrication and structure of head sliders for use in storage devices, such as hard disk drives (HDDs), and in particular the provision and usage of electrical bond pads on a slider surface structure to accommodate needs of slider design and fabrication process as well as slider operation within a disk drive.

Head sliders (sliders, for short) are fabricated for utilization within HDDs for positioning a magnetic head including, e.g., read and write elements, relative to one or more spinning disks. Each slider typically includes read elements and write elements along with electrical contacts to facilitate electrical connection with an electronic data control system. Sliders are also provided with air bearing features that controllably guide the manner by which the slider flies at a "fly height" on an air bearing created by a spinning disk. Specifically, the aerodynamic properties of the slider topography influence the fly height, pitch, roll, and other important features of the slider. These features of the slider range in size from nanometer size to millimeter size. Sliders may also include writers, read elements (e.g., readers), and/or reader-heaters used to modulate the distance of the slider from a magnetic disk contained in an HDD by using thermal expansion properties of the materials that compose the slider.

Typically, a separation distance between the slider, which contains the read and write elements (e.g., transducers) and the air bearing features, and a spinning magnetic disk is ten nanometers (nm) or less. The separation distance in this context is generally referred to as a fly height. In order to improve reading areal density, it is generally desirable to reduce the separation distance. One way to increase performance and to allow for smaller separation distance is to better flatten or reduce the roughness or imperfections of certain of the slider element surfaces, namely the air bearing surface (ABS). Moreover, smaller and smaller sliders are being designed to fly closer to the disk, and more and more electronic functionality is desired.

The fabrication process of a slider includes a multitude of steps involving a high level of complexity, low tolerances, and small size specifications. Typical process steps include fine line photolithography, reactive ion etching, ion milling, and thin film deposition. The sliders may include a substrate portion, an insulator layer, and a multilayer thin film portion that includes various operative layers and elements of the slider, such as read and write transducers, heater elements, laser elements, and others, as are known and developed. The sliders are generally fabricated utilizing well-known wafer build techniques.

An important slider fabrication process step is a plate lapping step that is used to ensure that the surface roughness of the slider ABS is minimal. Plate lapping is a machining process that uses an abrasive material to wear away, flatten, and/or smoothen a surface. Materials used in the manufacturing of a slider vary depending on the desired properties. Typically, magnetic recording heads are constructed from a variety of materials; e.g., magnetic alloys, metal conductors, ceramic and polymer insulators in a complex three dimensional structure with precise tolerances.

Sliders are fabricated from wafers that are created based upon the materials and layers specified for a desired slider construction. From such a wafer, a chunk or portion of the wafer is separated from the rest, which portion is typically dimensioned based upon a desired number of rows and number of sliders in each row. The wafer portion is sliced into the number of rows provided, creating an equal number of slider bars as there are rows.

In the form of slider bars, a collective slider bar ABS is generally lapped for sizing the sliders, while increasing surface flatness and decreasing surface roughness. The ABS of each slider may be lapped to comply with desired surface standards. After lapping, the individual sliders can be diced from one another.

In order to monitor the progress of a lapping operation, an electrical method has been developed utilizing electrical lapping guides (ELGs) as provided within the layered structure for each slider. By many developed electrical processes, electrical resistance is typically measured across bond pads (e.g., terminals or poles) as bond pad pairs that are electrically connected with the ELGs within the slider. These bond pads are known as ELG pads. The ELG pads are typically located on the slider trailing edge (TE) along with other bond pads that are provided for electrical device functionality of the many devices of recently developed slider designs. Not only is there becoming greater desire for more device bond pads, but less area for these bond pads may be available as sliders continue to shrink in size to accommodate higher density of data storage and smaller form-factor HDDs.

ELG pads are generally positioned to be electrically accessed on the slider TE and so that as the slider air bearing surface is reduced by lapping or otherwise, a width of the ELGs is reduced. As the ELGs are reduced in width, a measure of resistivity across the ELG pads increases until a determined value is reached, or until the circuit becomes open.

In various slider designs, ELG pads may take up approximately the lower half of the TE of each slider. The device bond pads are typically fully located within the upper half region of the slider TE. Moreover, the ELG pads are often sized for electrical connection, such as by a mechanical wire bonding process (using, e.g., gold wire), so that they can be temporarily electrically connected to the ELG bond pads for resistance monitoring during the lapping process and then removed from the ELG bond pads. Such mechanical wire bonding, as a general matter, requires greater bond surface area than the electrical bond pads for device functionality, which can utilize other developed solder techniques with smaller wires and/or flexible circuit terminals. After wafer and slider processing is complete, there is often no further functionality of the ELG pads. The ELG pads remain on the surface of the slider TE, but are generally inactive during operation of an HDD.

As the ELG pads typically occupy a significant amount of the available surface area of the TE of the slider, paired with a concurrent need for increased quantity of devices and functionality, a shortage of space for additional bond pads can lead to a desire to make better or more efficient use of existing bond pads and available slider surface area in general.

SUMMARY

The present invention is directed to techniques and bond pad designs to reduce the number of bond pads needed at a slider trailing edge by providing multiple-functionality to select bond pads. As disclosed herein, by employing a "center tap" at or near an operative voltage null point in various circuit arrangements, one or more bond pads may be shared between various writer components on one hand, and read elements and reader components on the other hand.

According to a first aspect, a head slider for use in a disk drive is movably positionable relative to a magnetic recording disk and includes at least one write element for writing data to the magnetic recording disk. The write element includes a writer coil electrically connected between a first bond pad and a second bond pad, where the connection between the first bond pad and the second bond pad includes a center tap located proximate to a voltage null point. The head slider also includes at least one read element for reading data from the magnetic recording disk, the read element electrically connected between the center tap and a third bond pad, where the write element and the read element are configured to be selectively activated based on biased inputs to the first bond pad, the second bond pad, and the third bond pad.

According to a second aspect, a method of making a head slider for use in a disk drive includes providing at least one write element for writing data to a magnetic recording medium. According to the method, the write element is electrically coupled between a first bond pad and a second bond pad, forming a write circuit. The method also includes determining a voltage null point in the write circuit. The method also includes electrically coupling a center tap proximate to the determined null point in the write circuit and providing at least one reader-heater element for reading data from the magnetic recording medium, where the reader-heater element is electrically connected to the center tap and to a ground.

According to a third aspect, a head slider for use in a disk drive is movably positionable relative to a magnetic recording disk. The head slider includes at least one write element for writing data to the magnetic recording disk and a writer coil electrically connected between a first bond pad and a second bond pad, where the connection between the first bond pad and the second bond pad has a center tap located proximate to a voltage null point. The head slider also includes at least one contact sensor. The contact sensor is electrically connected between the center tap and a third bond pad, where the write element and the contact sensor are configured to be selectively activated based on biased inputs to the first bond pad, second bond pad, and third bond pad.

BRIEF DESCRIPTION OF THE DRAWINGS

The disclosure may be more completely understood in consideration of the following detailed description of various embodiments of the disclosure in connection with the accompanying drawing, in which:

FIG. 2A is a schematic representation of writer and reader-heater circuitry, where the writer is active based upon applied voltages at select bond pads, according to one embodiment.

FIG. 2B is a schematic representation of writer and reader circuitry of FIG. 2A, where a reader-heater is active by changing the applied voltages as applied to select bond pads, according to one embodiment.

FIGS. 3A-3B are schematic representations of writer and reader circuitry, where a forward biased diode is placed between the writer and the reader-heater and with differing applied voltages as applied to select bond pads.

DETAILED DESCRIPTION

Figure 1:
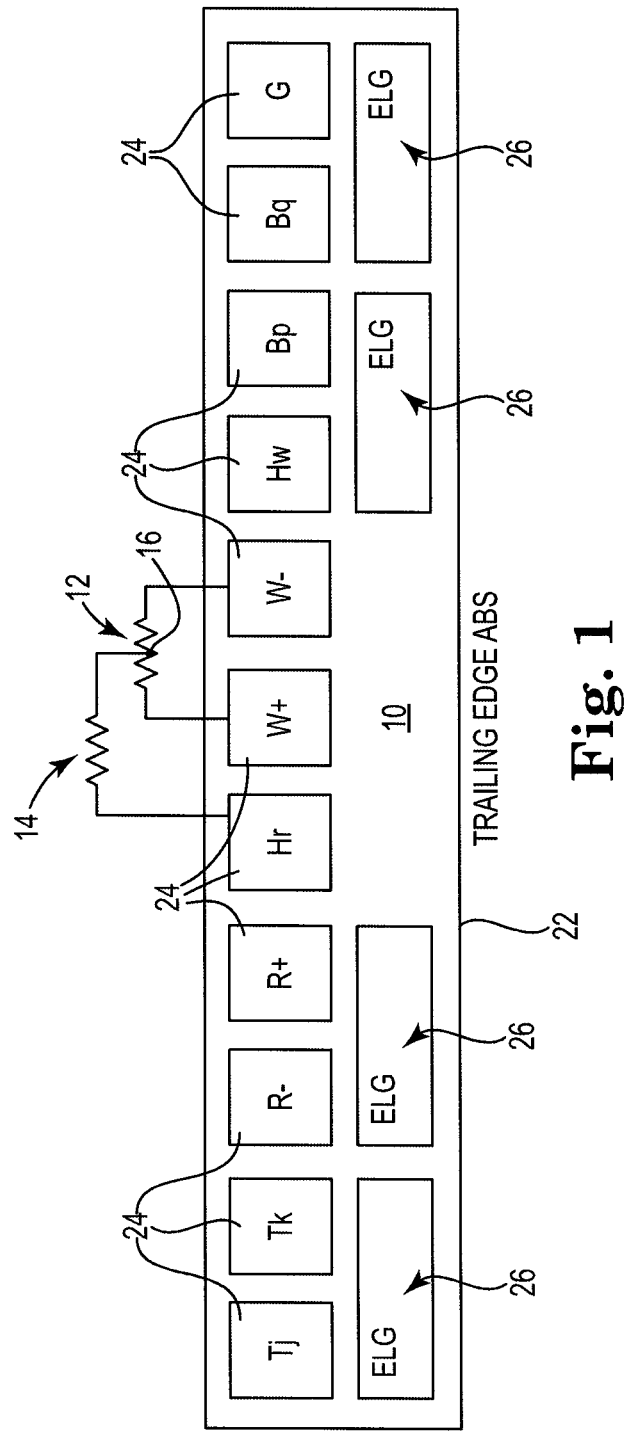
FIG. 1 is a schematic illustration of a trailing edge of a head slider, as such can be positioned relative to a supporting head suspension assembly and showing electrical bond pads arranged in rows over a surface area of the slider.

There is a growing need to make efficient use of the number of bond pads (also known as contact pads) that are exposed on the trailing edge (TE) of an air bearing surface (ABS) of a magnetic head on a slider for use in a storage device such as a hard disk drive (HDD). Disclosed herein are methods and structures for increasing the functionality available for the number of bond pads on a given slider, by sharing bond pads between devices. Additional functionality, including new components, are increasingly important for a given slider. One example of a new component that can be included in a slider is heat-assisted magnetic recording (HAMR) technologies, further described herein. Harmful tradeoff effects may also be reduced in the process of sharing bond pads, adding additional benefits. Generally, the number of bond pads available may be limited by circuit noise (e.g., cross-talk), parasitics, manufacturing constraints, and/or slider form factor constraints. In order to maximize slider surface space for bond pads, various other tradeoffs can apply, including reducing the number and size of other components on the slider, which can add cost and/or complexity to the slider. Using disclosed techniques and structures can improve functionality for a given slider surface area (e.g., TE surface area), or can lead to a reduction in slider component size. Other benefits may include improvements in read/write performance and/or reductions in the cost of manufacturing described slider structures, when compared to current techniques and structures.

Read elements are to be construed broadly, herein, and can include readers and also reader-heater components, among others. Various other HAMR-related components may also be included. In order to share a bond pad, a read element (e.g., a reader-heater or reader) may be electrically coupled to a circuit formed by two bond pads having voltage potentials, with the write element (e.g., a writer or writer coil) positioned in between. The read element may be coupled to this writer circuit at (or proximate thereto) a center tap, which is preferably located at or near a null point in the circuit. In embodiments, a center tap located proximately to a voltage null point can be determined based on an electrical potential gradient.

During the write operation the two voltage potentials are configured to be of alternating and opposite polarity such that the write waveform is an alternating current (AC) signal. The null point in the writer circuit is defined as a point at which the potential at any instant of time is zero. The two bond pad potentials, at other times, may have a same voltage polarity (common mode voltage), in which case a reader-heater could be active and the writer would become inactive. Generally, there is not a desire to operate a writer and a reader-heater at the same time in a slider of an HDD, leading to little compromise to performance in such a configuration. The following will describe the above in greater detail.

Various embodiments are directed to a transducer that incorporates a set of bond pads coupled to respective direct current (DC) and AC bias sources and a multiplicity of DC components coupled to the bond pad set, where at least one of the bond pads coupled to a DC bias source is shared between at least two of the DC components. Some embodiments are directed to a transducer that incorporates a set of bond pads coupled to respective DC and AC bias sources and a multiplicity of AC components coupled to the bond pad set, where at least one of the bond pads coupled to an AC bias source is shared between at least two of the AC components. Other embodiments are directed to a transducer that incorporates a set of bond pads coupled to respective DC and AC bias sources and a multiplicity of AC and DC components is coupled to the bond pad set, wherein at least one of the bond pads is shared between an AC component and a DC component, such as by alternately operating the AC and DC components.

FIG. 1 is an arrangement of a plurality of bond pads 24 and 26 of a trailing edge 22 of a head slider 10. Specifically, an eleven pad first pad 24 arrangement is shown as a specific example that might be usable for a heat-assisted magnetic recording (HAMR) slider design. Other numbers of bond pads may also be used, e.g., nine or ten bond pads or other arrangements. Also, two pairs of ELG bond pads 26 are shown. After the fabrication process of the slider 10 is complete, the ELG bond pads 26 may have no further utility.

The head slider 10 may be operatively supported from a head suspension assembly (HSA) (not shown). The operative connection between a slider 10 and the HSA typically includes the provision of a gimbal or flexure element (not shown) for permitting the slider to move at least in pitch and roll directions relative to a spinning disk. The gimbal or flexure can be created integrally with the HSA or as a separate component and attached to the HSA. In either case, the gimbal or flexure includes a slider bond pad (not shown) to which the slider 10 is attached for controlled movement of the slider 10 as the slider ABS flies over the media surface of a spinning disk.

A trailing edge 22 of the slider 10 includes a series of first electrical contacts or bond pads 24 that are illustrated in a row over a portion of the trailing edge 22. An adjacent row of a second series of electrical contacts or bond pads 26 is also shown. The second row of bond pads 26 are relatively larger than those of the bond pads 24 of the first row. Illustrated is one of any number of suitable orientations and arrangements of bond pads 24 and 26 with respect to one another.

According to the illustrated embodiment of slider 10, the relatively smaller bond pads 24 are provided for electrical connection to the many transducer devices and other devices of a developed slider design, such as including contacts for read and write elements that include transducers, read and write heaters, bolometers, and/or laser elements as may be provided for operation of various head slider designs and configurations, such as various HAMR configurations, among others. Certain functional elements of such a slider 10 can require positive and negative bond pads 24 for electrical operation, while others require a single bond pad 24 for electrical operation. These bond pads 24 are conventionally electrically connected with wires or conductor elements that are typically provided to extend along the supporting HSA for controlled operation of each of the functional elements of the head slider 10. Techniques for providing a permanent electrical connection between a conductor and a bond pad 24 include soldering and spraying techniques, and the like.

In an embodiment, the second set of bond pads 26 are relatively larger and are provided for utilization during the fabrication process of the head slider 10 from a wafer or fabricated substrate, as opposed to the operative use of bond pads 24 for slider 10 elements during operation of an HDD. These bond pads 26 can preferably be provided to allow for temporary positive and negative electrical connection of electrical lapping guides during slider fabrication processes. As such, a pair of the bond pads 26 are used as ELG pads for ELG monitoring during slider processing. Multiple pairs of bond pads 26 and ELGs are preferably utilized during fabrication.

A pair of ELG pads 26 may be electrically connected with temporary conductors by which a resistance across the ELG pads 26 can be measured and monitored. The surface of the slider 10 designed for facing the disk is known as an air bearing surface (ABS). The ABS is fabricated during slider production, such as by ion milling or other milling operations and/or by a lapping process, so as to be precisely flat and aerodynamically designed. These fabrication techniques also provide the desired access of each operative transducer element that is to interact with the magnetic media of a disk at the ABS near and adjacent to the TE 22 of the slider 10. During a lapping or milling process, ELG material as exposed to the process can be gradually removed. By monitoring the electrical resistance across an ELG pad 26, the lapping or milling process can be effectively monitored. The removal process can be monitored and ceased upon the reading of a determined resistance or upon reaching an open circuit.

After the ELG pads 26 are utilized during the fabrication process, the ELG pads 26 may no longer be necessary to slider 10 operation within an HDD. However, as in the illustrated embodiment, the ELG pads 26 take up about half of the available surface area of the TE 22 of the slider 10. The size of the ELG pads 26 is largely governed by the accessibility to them for temporary wire bonding and unbonding of conductors for use during the lapping or milling fabrication steps. This wire bonding process is generally a mechanical bonding process. Moreover, as also noted herein, the surface area of the TE 22 that is available to provide the many needed bond pads 24 and 26 is becoming smaller and smaller as sliders 10 are designed for greater and greater data density to the spinning media. Sliders designs, such as various HAMR embodiments, may require an increased number of bond pads 24, which may be desired for functionality of the many transducer elements of the head design.

FIG. 2A is a schematic representation of writer and reader-heater circuitry, where the writer is active, according to one embodiment.

Two electrical bond pads (e.g., terminals or poles) configured to be electrically biased are provided, where the first bond pad 206 has a positive applied voltage, and a second bond pad 208 has a negative applied voltage (i.e., electrical potential), according to one embodiment. First bond pad 206 and second bond pad 208 may be bond pads or may be electrically coupled to bond pads (seen best in FIG. 11 at 118) for use in a slider (e.g., slider 10 of FIG. 1). Bond pads 206, 208 can be similar to bond pads 24 of FIG. 1. Connecting the first bond pad 206 to the second bond pad 208 is a writer coil 210, simplified and illustrated as a resistor. Also with reference to FIG. 1, the first bond pad and the second bond pad can be represented as bond pads 24, and the writer coil 210 can be shown as a first device (e.g., resistor) 12. Between the first bond pad 206 and the writer coil 210 is an electrical trace (or other suitable connection) 212 having an impedance $Z_{W1}$. Between the second bond pad 208 and the writer coil 210 is an electrical trace (or other suitable connection) 214 having an impedance of $Z_{W2}$. At (or proximate to) a point where the impedances of the circuit formed by the traces (with respective impedances $Z_{W1}$ and $Z_{W2}$) and the writer coil 210 are operatively equal (in other words, a point in the circuit where the potential is zero), regardless of distance, a location of an impedance null point 215 is determined. With reference again to FIG. 1, null point 215 can also be represented as null point 16 of the first device 12. According to some embodiments, the null point 215 may be selected as a center tap such that the null point 215 has substantially zero potential. The potential at the null point 215 may be the mean value of the ground potential. The location of null point 215 and center tap may not be physically centered along the traces and electrical path, as shown, but is preferably centered in terms of a bisection or midpoint of an impedance gradient, which may be physically off-center in terms of a trace distance separating bond pads 206 and 208.

According to another embodiment, voltages at the first bond pad 206 and the second bond pad 208 may also be imbalanced (of different magnitude), intentionally or otherwise. Through imbalance in bond pad voltage bias, the voltage and electrical potential null point 215 may be off-center to a greater extent than discussed, above. Writer coil 210 may or may not include the null point 215, internally. Connected preferably to the operative null point 215 is a reader-heater (or a reader or other component) 216 and trace having an impedance of $Z_{RH}$. With reference again to FIG. 1, the reader-heater 216 can be shown as a second device (e.g., resistor) 14 connected to a bond pad 24 and to null point 16 of the first device 12. Reader-heater 216 is then grounded to a ground pad (see also bond pad labeled "G" of bond pads 24 of FIG. 1), according to one embodiment. The embodiments are shown in various arrangements, but are not to be taken to be the only embodiments contemplated.

According to the shown embodiment of FIG. 2A, the first bond pad 206 has a positive voltage and the second bond pad 208 has a negative voltage. As a result of reader-heater 216 being electrically coupled at writer coil 210 null point 215, and having bond pads of opposite polarity, current will flow from the first bond pad 206 to the second bond pad 208, passing through and activating writer coil 210. When write mode is active, the section of the circuit having impedance $Z_{W1}$ may have associated current flow of $I_1$. Likewise the section of the circuit having impedance $Z_{W2}$ may have associated current flow of $I_2$. The section of the circuit having impedance $Z_{RH}$ has an associated current flow of $I_3$. As an objective, current $I_3$ can preferably be minimized in order to allow stable operation of writer coil 210. As a general objective, when the writer coil 210 is active, the voltage at the null point 215 if preferably minimized such that the null point potential is very small (most preferably zero) with respect to the ground potential. As the reader-heater 216 is not active during writing, there is no desired current flowing through the reader-heater 216 during writing. In other words, the parasitic effect of the reader-heater 216 being present in the circuit is minimized during writing if the null point 215 voltage is very small with respect to the ground potential (mean value).

When determining the location of the null point 215, the impedances $Z_{W1}$ and $Z_{W2}$, if set to being substantially equal, may reduce noise in a write-signal frequency range, employed during operation of the writer coil 210. Additionally, by setting the null point 215 at an impedance null point, undesirable heating of the reader-heater during writing may be minimized. It is generally preferable if the null point 215 (and center tap) voltage with respect to the mean ground potential is set and located at as near as possible to zero volts.

Various embodiments of the head slider, as described herein, may be configured to selectively activate either the writer coil 210 (write element) or the reader-heater 216 (read element), according to various embodiments. A control system may be employed to selectively apply voltage to the various bond pads in order to activate the various components in the head slider. An arrow shows the direction of current flow if the circuit is set up as described. Current would flow through writer coil 210, with a minimum of current flowing through reader-heater 216. In this way, the bond pads 206 and 208 serve the purpose of allowing the writer coil 210 to operate. The operation of the reader-heater 216 by sharing the same two bond pads is described below.

FIG. 2B is a schematic representation of writer and reader circuitry, where the reader-heater is active, according to one embodiment.

FIG. 2B includes the same layout and componentry as FIG. 2A. However, FIG. 2B includes a difference in applied bias voltage on the second bond pad 208. As such, the first bond pad 206 and the second bond pad 208 have equal and positive voltages applied. As a result of the two bond pads having voltages of like polarity and magnitude, the writer coil 210 has no net current flow, but, as shown by an arrow, current instead flows through the reader-heater 216. The current flow ends at a ground pad (also referred to herein simply as ground).

By changing the polarity of one of the two bond pads 206, 208, the reader-heater 216 is now activated, but the writer coil 210 is idled. Typically, in an HDD embodiment, a writer coil 210 and a reader-heater 216 would not generally be employed simultaneously. By selectively changing the magnitude and polarity of select bond pads' biases (e.g., in a slider using bond pads) now two bond pads can accomplish two discrete functions (writing and reading) that before would have taken two bond pads for writing and one bond pad for the reader-heater 216.

FIGS. 3A-3B are two schematic representations of writer and reader circuitry, where a forward biased diode is placed between the writer and the reader-heater, according to various embodiments.

Sharing bond pads between multiple electrical components (e.g., readers and writers) may raise issues relating to bias contention and/or degraded performance. Such issues can be mitigated through the use of biasing and/or filtering circuitry. FIG. 3A is an alternative embodiment that is similar to the embodiment shown in FIG. 2A, but a first diode 218 is added between the writer coil 210 and the reader-heater 216. The first diode can be forward biased, according to various embodiments. The first bond pad 206 has a positive voltage, as before, and the second bond pad has a negative voltage, as it does in FIG. 1A. The first diode 218 has its anode (i.e., an electrode from which conventional current enters a polarized device) connected to the null point 215 and its cathode (i.e., an electrode from which conventional current exits a polarized device) connected to one end of the reader-heater 216. In this configuration (FIG. 3A), the potential difference between the null point and the ground is zero or approximately zero and hence no current flows through the reader-heater 216.

A benefit of adding first diode 218 to the circuit, in this forward biased orientation, is that the first diode 218 helps to isolate the writer coil 210 from potential undesired ground noise during a writing operation. Performance degradation of the writer coil 210 due to undesired ground noise may thus be reduced. First diode 218, according to one embodiment, can be chosen to have a threshold voltage (built-in potential) greater than the sum of uncertainty in the null point potential ($|\Delta V_{null}|$) and fluctuation in ground potential ($|\Delta V_{ground}|$). In this way, if the first diode 218 threshold voltage is not exceeded by the combined effects of fluctuations in ground voltage and deviations from zero of the null point voltage due to null point uncertainty, the writer coil 210 during operation would not be substantially impaired. According to various embodiments, the first diode 218 may be a Zener diode. As used herein, a Zener diode is a diode where a sufficient voltage "Zener breakdown voltage" in the diode causes a current flow is a reverse direction, but otherwise acts as a traditional diode.

FIG. 3B is a schematic representation of writer and reader circuitry, where the reader-heater is active and where a first diode is placed between the writer null point 215 and the reader-heater, according to one embodiment. In FIG. 3B, as in FIG. 2B, the first bond pad 206 and the second bond pad 208 are set at a positive and equal voltage. Operation of the reader-heater 216 is similar to FIG. 2B, wherein the first diode 218 is in forward-biased mode and current flows through the reader-heater. It may be noted that in this case the magnitude of the common mode voltage on first bond pad 206 and second bond pad 208 is chosen to exceed the summed magnitudes of the built-in potential of the first diode 218 and fluctuation in ground potential.

Figure 4A:
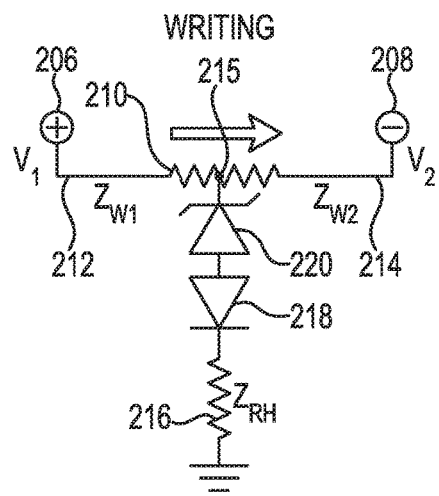
FIGS. 4A-4B are schematic representations of writer and reader circuitry, where two diodes are placed between the writer and the reader-heater and with differing applied voltages as applied to select bond pads.
Figure 4B:
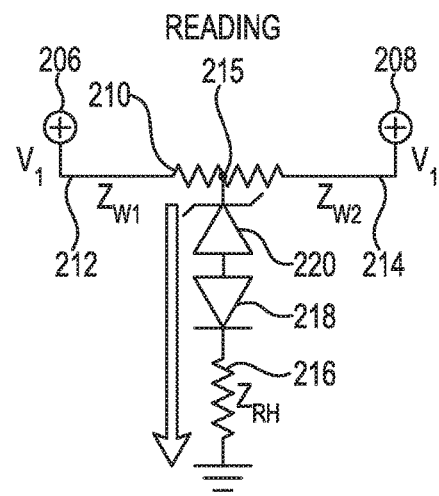

FIGS. 4A-4B are two schematic representations of writer and reader circuitry, where two oppositely-biased diodes are placed between the writer and the reader-heater, according to various embodiments.

FIG. 4A is another alternative embodiment that is similar to the embodiment shown in FIG. 3A, but a second (e.g., Zener) diode 220 is added between the first diode 218 and the null point 215. The anodes of the Zener diode 220 and first diode 218 face each other as shown in FIGS. 4A and 4B. According to the shown embodiment, the cathode of the Zener diode 220 is electrically proximate to the null point 215 and the cathode of the first diode 218 is proximate to the reader-heater 216. As in FIG. 3A, the writer coil 210 is active due to bond pads 206 and 208 having opposite applied polarity. In the configuration shown in FIG. 3A, the writer coil 210 operation may not be ground noise immune and may be susceptible to ground noise effects particularly if the magnitude of ground noise fluctuation exceeds the threshold (built-in voltage) voltage of the first diode 218. By adding the Zener diode 220 positioned before first diode 218 and configuring them in the manner shown in FIG. 4A, the writer coil 210 (during write operation) may be made immune to any ground noise fluctuation. The Zener breakdown voltage (reverse-bias mode) in this case may be selected and set to be greater than the magnitude of ground noise fluctuation. The addition of the Zener diode 220 thus preferably adds an additional safeguard to writer coil 210 operation in case the ground potential fluctuations exceeds in magnitude the built-in voltage of the first diode 218.

In the read mode when it is desired to have the reader-heater 216 active, the common mode voltage on bond pads 206 and 208 may be chosen to exceed the combined value of a Zener breakdown voltage of second (Zener) diode 220 and the built-in voltage threshold of first diode 218 so that the diode-pair lets current flow through the reader-heater 216. FIG. 4B illustrates this mode of operation.

FIG. 4B is another alternative embodiment that is similar to the embodiment shown in FIG. 4A, but where the voltages at the first bond pad 206 and the second bond pad 208 are positive and equal, similar to FIG. 3B, and as a result the reader-heater 216 is active. First diode 218 and second (Zener) diode 220 are positioned as in FIG. 4A.

Figure 5A:
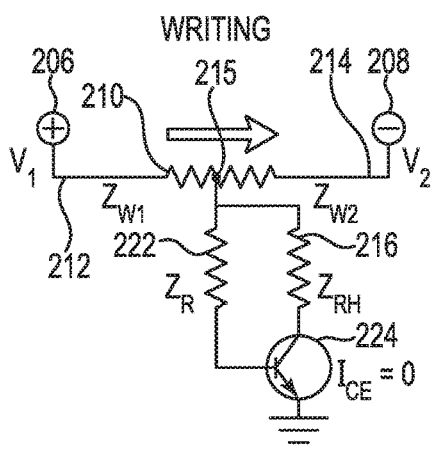
FIGS. 5A-5B are schematic representations of writer and read element circuitry where a grounded-emitted bipolar-junction transistor is included and with differing applied voltages as applied to select bond pads.
Figure 5B:
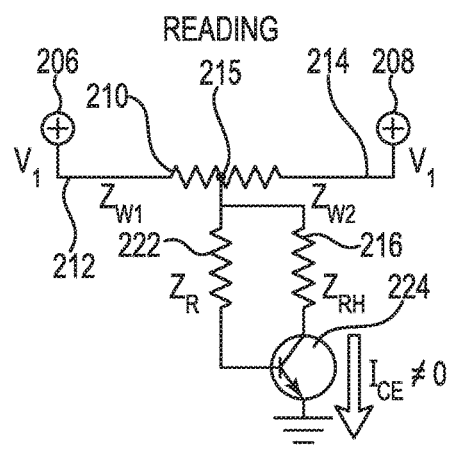

FIGS. 5A-5B are two schematic representations of writer and reader circuitry where a grounded-emitter NPN, N-channel bipolar-junction transistor (BJT) 224 is included, according to various embodiments.

The grounded-emitter BJT 224 provides similar functionality as the diode-Zener diode pair described earlier in the context of FIGS. 4A and 4B. It may be noted that with appropriate modifications to the configuration of the circuitry, alternative embodiments involving field-effect transistors (FET), either of the junction-FET type (JFET) or metal-oxide silicon (MOSFET) kind can be employed. These alternate devices may be more amenable to (more compatible with standard wafer processes) on-wafer fabrication, such as in the form of GaAs or AlGaN—GaN heterojunction FETs.

As shown, a first read element 222 is a reader, and the second read element 216 is a reader-heater. As shown, the first read element 222 is coupled to a base of a (e.g., BJT) transistor 224, the second read element 216 is coupled to a collector of the transistor 224, and the emitter of the transistor 224 is connected to a third bond pad, which may be a ground. In some embodiments, current flows through transistor 224 (FIG. 5B), and in other embodiments, transistor 224 is configured so that no current flows through it, also depending on voltage bias at the various individual bond pads (FIG. 5A).

FIG. 5A is a modified circuit layout, as compared to FIGS. 2A-4B. The writer coil 210 remains active, as in FIG. 4A. However, below the null point 215 and center tap (as shown, although different physical arrangements of similar components are contemplated), a split occurs in the circuit. On one side of the split is a resistor 222 with resistance of $Z_R$. The resistor 222 is then electrically coupled to the base of a grounded-emitter, BJT 224. On the other side of the split from the null point 215 is found a reader-heater 216, as before. The reader-heater 216 is now connected to the collector of the BJT 224. Finally, the emitter of the BJT 222 is connected to a ground (e.g., a third bond pad). In write mode, the current flows from the first bond pad 206 to the second bond pad 208, passing through the writer coil 210. In this configuration the base-to-emitter voltage and collector-to-emitter voltages are zero or nearly zero and hence the BJT 224 is turned "off" (current flow of zero from collector to emitter) so that substantially no current flows through the reader-heater 216.

FIG. 5B is a similar layout as FIG. 5A, except that the second bond pad 208 has a positive voltage. In this common-mode voltage configuration, the grounded emitter of the BJT 224 is at a lower potential relative to both the collector as well as base of the BJT 224 and hence, in this case, the BJT 224 is turned "on." In this case, current flows from collector to emitter and through the resistor 222 as well as the reader-heater 216.

Figures 6A, 6B:
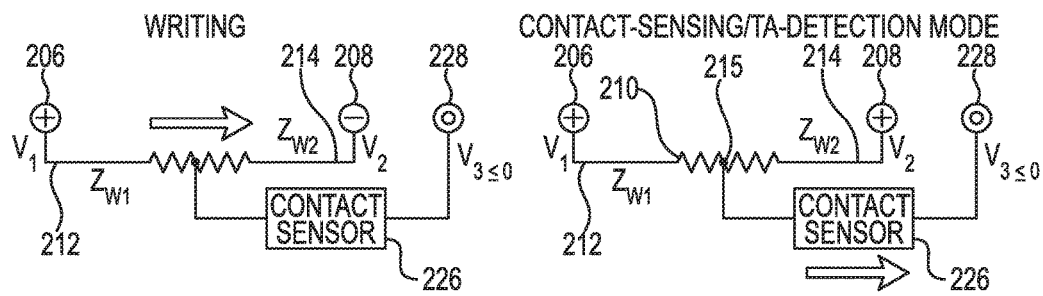
FIGS. 6A-6B are schematic representations of writer circuitry having a contact sensor connected thereto and with differing applied voltages as applied to select bond pads.

FIGS. 6A-6B are two schematic representations of writer circuitry having a contact sensor connected thereto, according to various embodiments.

FIG. 6A is a circuit similar to others described herein, but with a contact sensor 226 coupled to the null point 215 of the writer coil 210. In this depiction, the first bond pad 206 has a positive charge, as in other cases described, herein. And the second bond pad 208, in this case, has a negative applied voltage. As a result of the difference in electrical potential (voltage bias), current flows from the first bond pad 206 to the second bond pad 208, passing through the writer coil 210. The contact sensor 226 is present in this example, but it is inactive.

The contact sensor 226 is electrically connected to the null point 215. Contact sensor 226 is connected to a third bond pad 228 having a voltage of zero, according to the shown embodiment. As shown, contact sensor 226 is inactive (and the writer coil 210 is active). Contact sensors may be used for head-media contact-detection during drive calibration to set active clearance. Contact sensor 226 may be included in various embodiments to reduce a probability of a head crash or other undesirable contact between the slider 10 and a corresponding magnetic medium. In general, undesirable contacts between media defects and a recording head are described as "thermal asperity" (TA) events. Contact sensor 226 may be a temperature coefficient of resistance (TCR) sensor, such as a dual-ended temperature coefficient of resistance sensor (DETCR), or a thermocouple, according to various embodiments.

FIG. 6B is a similar layout to FIG. 6A, with the exception that the contact sensor 226 has current flowing therethrough, activating the contact sensor 226. FIG. 6B is a similar schematic layout as FIG. 6A, except that first bond pad 206 and second bond pad 208 now are shown having voltages of like polarity and magnitude.

The contact sensor is electrically coupled to a third bond pad 228, where the third bond pad 228 has a voltage of zero (third bond pad voltage can optionally be biased to less than zero). Therefore, as shown, current may flow through the contact sensor 226 to the third bond pad 228, which has a lower electrical potential (e.g., zero) than the first and second bond pads (206, 208). Third bond pad 228 may be connected to a voltage bias source, according to various embodiments.

Figures 7A, 7B:
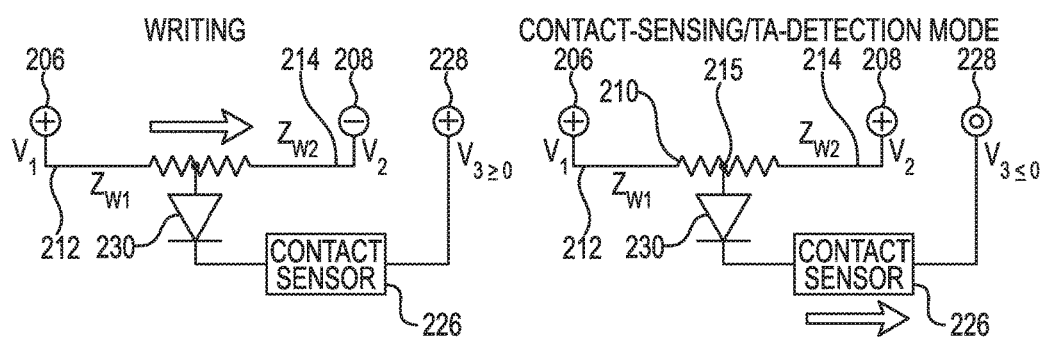
FIGS. 7A-7B are schematic representations of writer and contact sensor circuitry, with a diode connected therebetween and with differing applied voltages as applied to select bond pads.

FIGS. 7A-7B are two schematic representations of writer and contact sensor circuitry, with a diode connected therebetween, according to various embodiments.

FIG. 7A is a similar layout to FIG. 6A, but a first diode 230 is positioned between the null point 215 and the contact sensor 226. The anode of diode 230 is proximate to the null point 215 and center tap, and the cathode of the diode is proximate to one end of the contact sensor 226. As with FIG. 3A-3B, the diode 230 can be added to improve insulation of the writer coil (e.g., writer coil 210), for example during write operation, from noise or other disturbance (in this case potential contact sensor noise). First diode 230 may be similar to first diode 218, as shown herein, and as such may be have its anode proximate to the null point 215 on the writer coil circuit. Other characteristics can be substantially similar to FIG. 6A with the exception that third bond pad now has a positive-biased voltage, but could also be set to zero. In the shown embodiment first bond pad 206 and second bond pad 208 have opposite voltages, causing the writer coil to activate. In this case the contact sensor 226 is inactive.

FIG. 7B is a similar layout to FIG. 6A, but a first diode 230 is positioned between the null point 215 and the contact sensor 226. As with FIG. 3A-3B, the diode 230 is added to improve insulation of the writer coil circuit from contact sensor noise or other disturbance. Other characteristics are substantially similar to FIG. 6A. In the shown embodiment first bond pad 206 and second bond pad 208 have voltages of equal magnitude and like polarity, and third bond pad 228 has a voltage of zero or less, causing the contact sensor 226 to become active. The contact sensor 226, when active, may detect contact or TA events. In this case the writer coil 210 is inactive. In both FIGS. 7A and 7B, alternative embodiments may omit diode 230.

Figures 8A, 8B:
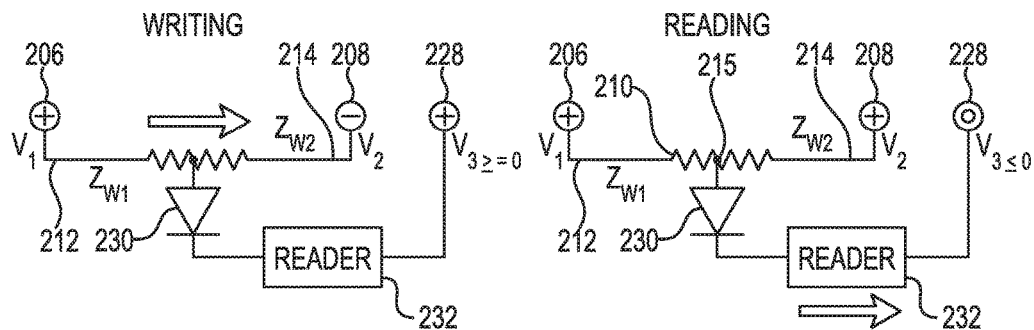
FIGS. 8A-8B are schematic representations of writer and reader circuitry, with a diode connected therebetween and with differing applied voltages as applied to select bond pads.

FIGS. 8A-8B are two schematic representations of writer and reader circuitry, with a diode connected therebetween, according to various embodiments.

FIG. 8A is a similar layout to FIG. 7A, except that contact sensor 226 is replaced with a reader 232. The reader 232 may be dual-ended for practical reasons (two ends connected to a bias source), as opposed to a reader-heater (which may preferably be single-ended, with one end connected to ground) as shown in other embodiments. Other characteristics are equivalent to those of FIG. 7A.

FIG. 8B is a similar layout to FIG. 7B, except that contact sensor 226 is replaced with a reader 232. The reader 232 may be a reader-heater (e.g., reader-heater 216), according to various embodiments. Other characteristics can be equivalent to those of FIG. 7B. In both FIGS. 8A and 8B, alternative embodiments may omit diode 230.

Figures 9A, 9B:
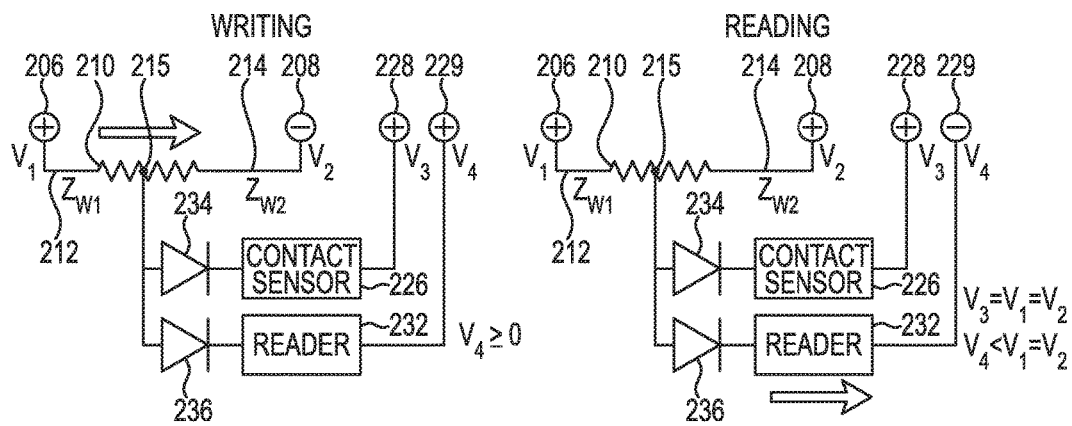
FIGS. 9A-9C are schematic representations of writer, reader, and contact sensor circuitry, where diodes are positioned between the writer and the contact sensor and reader, respectively and with differing applied voltages as applied to select bond pads.
Figure 9C:
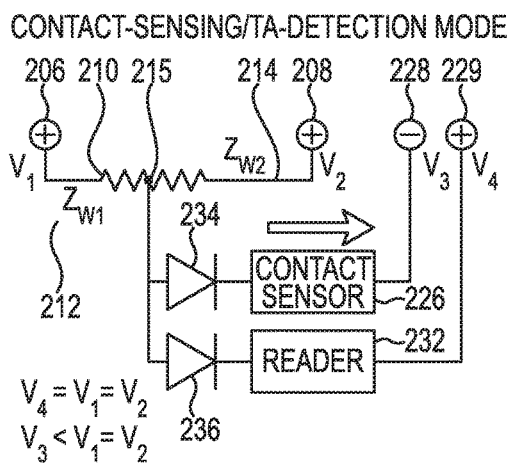

FIGS. 9A-9C are schematic representations of writer, reader, and contact sensor circuitry, where diodes are positioned between the writer and the contact sensor and reader, respectively, according to various embodiments.

FIG. 9A is a layout having the center-tapped null point 215 as shown in FIG. 2A, including the first bond pad 206 and the second bond pad 208, but alternative circuitry is shown as coupled to null point 215. Changing the bias of the various bond pads (by coupling the bond pads to various voltage biasing sources) allows a slider 10 to activate various components that have shared bond pads. As shown, writer coil 210 is active, with inactive contact sensor 226 and reader 232.

A first diode 234 is electrically coupled to null point 215 and a contact sensor 226 such that the anode of the diode 234 is proximate to the null point 215 and the cathode proximate to one end of the contact sensor element 226. Contact sensor 226 is then electrically connected to a third bond pad 228 having a third bond pad voltage. In the shown embodiment, the third bond pad voltage is positive, but may be set to zero, according to other embodiments.

A second diode 236 may be electrically coupled to the null point 215 and a reader 232 such that the anode of the diode is proximate to the null point 215 and the cathode is proximate to one end of the reader 232. The contact sensor 226 and the reader 232 may be connected in parallel to the null point 215. Reader 232 is then connected to a fourth bond pad 229 having a fourth bond pad voltage. The fourth bond pad 229 applied bias voltage is depicted as zero in this embodiment, but alternatively may be positive, according to other embodiments.

FIG. 9B is a layout similar to FIG. 9A, but as shown, reader 232 is active, with inactive writer coil 210 and contact sensor 226. Voltage at first bond pad 206 and second bond pad 208 are shown as set to equal magnitude and positive polarity, with third bond pad 228 set to positive voltage (equal to or greater than the common-mode voltage applied at first bond pad 206 and second bond pad 208) and fourth bond pad set to a negative voltage. Due to the fourth bond pad 229 having opposite polarity as the first bond pad 206 and the second bond pad 208, and the null point being also positive voltage, current will then flow through reader 232, causing the reader 232 to become active.

FIG. 9C is a layout similar to FIG. 9A, but as shown, contact sensor 226 is active, with inactive writer coil 210 and reader 232. Changing the bias of the various bond pads allows a slider 10 to activate various components that have shared bond pads. Voltage at first bond pad 206 and second bond pad 208 are shown as set to equal magnitude and positive polarity, with third bond pad 228 set to negative voltage (or at least a voltage less than the voltage of the first bond pad 206 and the second bond pad 208) and fourth bond pad 229 set to a positive voltage equal to or greater than the voltage found at the first bond pad 206 and the second bond pad 208. Due to the third bond pad 228 having opposite polarity as the first bond pad 206 and the second bond pad 208, and the null point being also positive voltage, current will then flow through contact sensor 226, and activating the contact sensor 226.

Figure 10A:
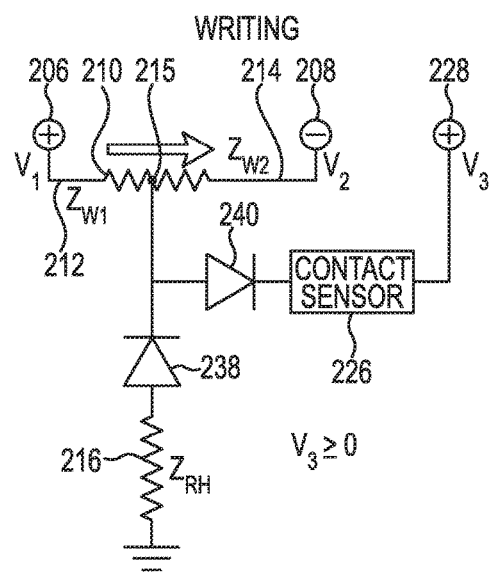
FIGS. 10A-10C are schematic representations of writer, reader-heater, and contact sensor circuitry, where diodes are positioned between the writer and the contact sensor and reader-heater, respectively, according to various embodiments.
Figure 10B:
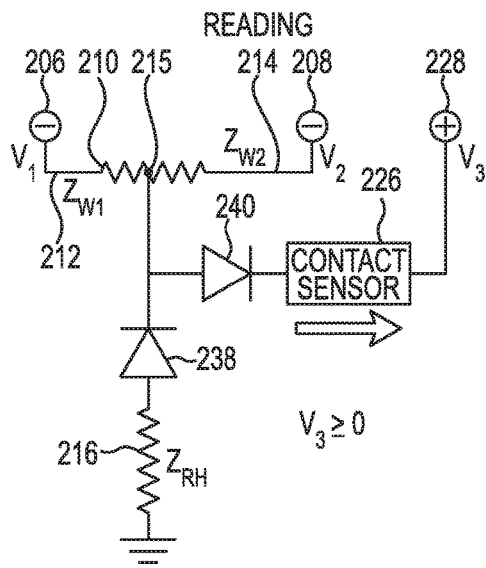
Figure 10C:
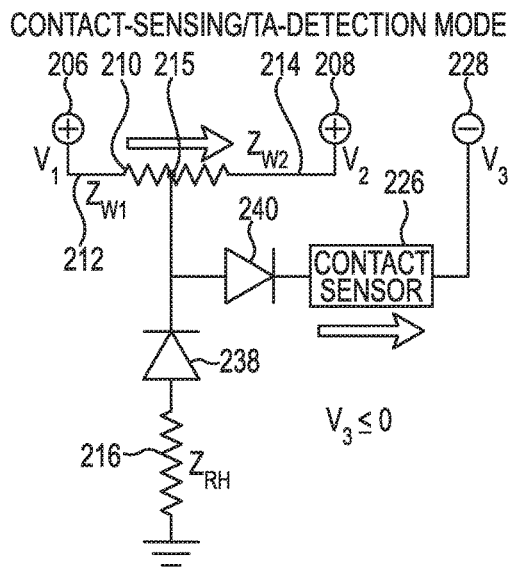

FIGS. 10A-10C are schematic representations of writer, reader-heater, and contact sensor circuitry, where diodes are positioned between the writer and the contact sensor and reader-heater, respectively, according to various embodiments.

FIG. 10A is a layout having a center-tapped null point 215 similar to FIG. 2A, including the first bond pad 206 and the second bond pad 208. In this embodiment, alternative circuitry is shown as coupled to null point 215. Changing the voltage bias of the various bond pads allows for various components of slider 10 to be activated that have shared bond pads. As shown, writer coil 210 is active due to a positive voltage at the first bond pad 206 and a negative voltage at the second bond pad 208, with inactive contact sensor 226 and reader-heater 216. A first diode 240 is positioned between the null point 215 and the contact sensor 226 such that the anode of the first diode 240 is proximate to the null point 215 and the cathode proximate to the contact sensor 226. Also connected to the contact sensor is a third bond pad 228, which may have a positive or zero voltage.

A reader-heater may also be connected to the null point 215, with a second diode 238 located between the null point 215 and the reader-heater 216 such that the anode of the second diode 238 is proximate to one end of the reader-heater 216 and the cathode proximate to the null point 215. The reader-heater 216 may be electrically coupled to a ground. According to this embodiment, the contact sensor 226 and the reader-heater 216 are connected in parallel to the null point 215, and the diode of each is positioned independently of the other electrical circuit path.

FIG. 10B is a layout similar to FIG. 10A. As shown, the first bond pad 206 and the second bond pad 208 have negative voltages of equal magnitude, and third bond pad 228 has a positive voltage. Therefore, as shown, reader-heater 216 is active, with inactive writer coil 210 and contact sensor 226.

FIG. 10C is a layout similar to FIG. 10A. As shown, the first bond pad 206 and the second bond pad 208 have positive voltages of equal magnitude, and third bond pad 228 has a negative (or zero) voltage. Therefore, contact sensor 226 is active, with inactive writer coil 210 and reader-heater 216. According to various embodiments, a bolometer or a laser power monitor may be employed in place of contact sensor 226 while leaving other aspects unchanged.

Figure 11:
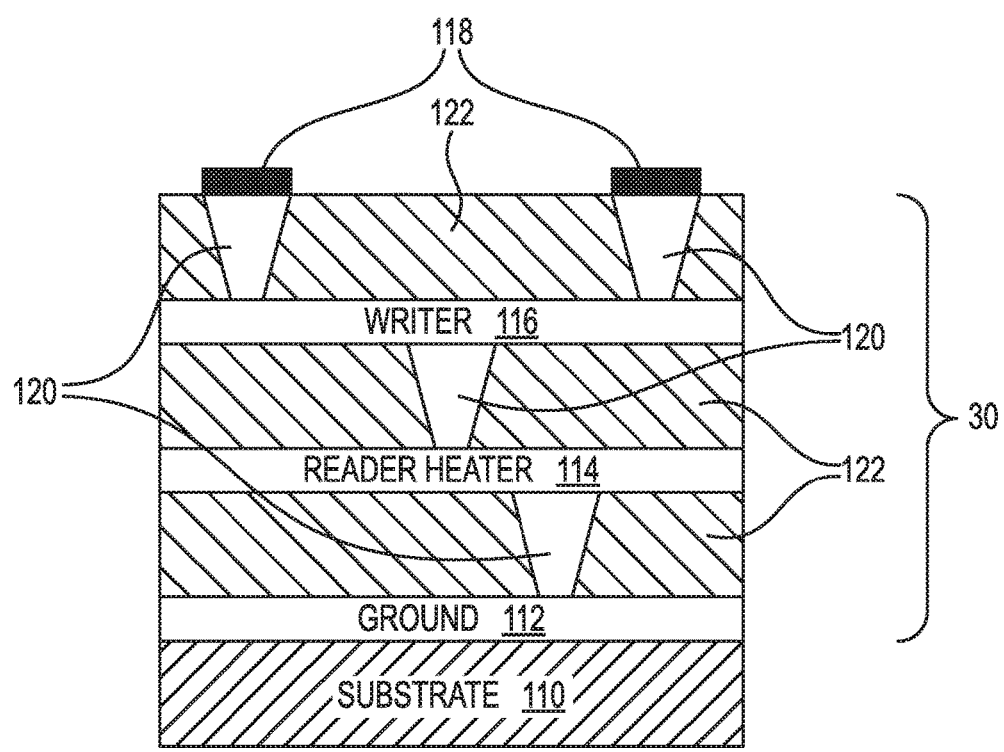
FIG. 11 is a cross-sectional view of a portion of a slider, according to one embodiment.

FIG. 11 is a cross-sectional view of a portion of slider 10. Slider 10 may include a substrate portion 110 and a multilayer thin film laminate portion 30, which preferably are separated from each other by an insulator layer(s) 122. The multilayer thin film laminate portion 30 includes the operative elements that are built within the slider 10 for functionality, as noted herein, such as including read and write transducers, heater elements, photonic elements, bolometers, and the like. In the shown embodiment, operative elements include the writer coil 116 (which may be similar to writer coil 210), the reader-heater 114 (which may be similar to reader-heater 216), and the ground 112. These elements and the like as have been or are developed for operation within a slider structure are herein referred to as transducer elements. These transducer elements can be formed as thin film structures within the multilayers of the laminate portion 30, as known. Each of these structures is electrically connected with one or more bond pads 118 (which may be similar to bond pads 24, first bond pad 206 and second bond pad 208) to be functional, such as by conductive vias 120 (or towers) that are formed through the multilayers of the laminate portion 30, as is also known. ELG devices can also be formed within the multilayer laminate structure 30 and each ELG would be connected to a pair of bond pads 26, as shown in FIG. 1, by conductive vias within the structure of the slider 10.

As has been described throughout this disclosure, a first component may be in line between two bond pads, with a second component attached to the circuit formed by the first component at or proximate to an impedance null point. The second component may be grounded or connected to a third bond pad. In so doing, bond pads on a slider may be shared and additional components may be added to the slider having a given number of bond pads when compared to existing methods and structures.

As used herein, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Reference is made herein to the accompanying drawings that form a part hereof and in which are shown by way of illustration at least one specific embodiment. The detailed description provides additional specific embodiments. It is to be understood that other embodiments are contemplated and may be made without departing from the scope or spirit of the present disclosure. The detailed description, therefore, is not to be taken in a limiting sense. While the present disclosure is not so limited, an appreciation of various aspects of the invention will be gained through a discussion of the examples provided.

What is claimed is:

1. A head slider for use in a disk drive and to be movably positionable relative to a magnetic recording disk, the head slider comprising:
   at least one write element for writing data to the magnetic recording disk, the write element including a writer coil electrically connected between a first bond pad and a second bond pad, wherein the connection between the first bond pad and the second bond pad includes a center tap located proximate to a voltage null point; and
   at least one read element for reading data from the magnetic recording disk, the read element electrically connected between the center tap and a third bond pad;
   wherein the write element and the read element are configured to be selectively activated based on biased inputs to the first bond pad, the second bond pad, and the third bond pad.

2. The head slider of claim 1, further comprising a control system for selectively applying a first voltage bias across the first and second bond pads for controllably writing data to the magnetic recording disk and for selectively applying a second voltage bias from the first and second bond pads across the read element to the third bond pad during a reading operation of the read element.

3. The head slider of claim 1, further comprising:
   a reader-heater operatively positioned relative to the read element for controlling a fly height of the read element relative to the magnetic recording disk, wherein the reader-heater is electrically coupled to the center tap and is electrically connected between the center tap and a third bond pad.

4. The head slider of claim 1, further comprising a first diode having a forward bias electrically connected between the center tap and the third bond pad.

5. The head slider of claim 4, wherein the first diode is a Zener diode configured to have a first Zener breakdown voltage.

6. The head slider of claim 4, further comprising a second diode having a reverse bias electrically connected between the center tap and the first diode.

7. The head slider of claim 1, further comprising:
   a reader-heater electrically connected between the center tap and a third bond pad; and
   a transistor having a base, a collector, and an emitter;
   wherein the read element is coupled to the base of the transistor, wherein the reader-heater is coupled to the collector of the transistor, and wherein the emitter of the transistor is connected to the third bond pad.

8. A method of making a head slider for use in a disk drive, comprising:
   providing at least one write element for writing data to a magnetic recording medium, the write element electrically coupled between a first bond pad and a second bond pad, forming a write circuit;
   determining a voltage null point in the write circuit;
   electrically coupling a center tap proximate to the determined null point in the write circuit; and
   providing at least one reader-heater element for reading data from the magnetic recording medium, wherein the reader-heater element is electrically connected to the center tap and to a ground.

9. The method of claim 8, further comprising:
   providing a control system configured to:
   selectively apply a first voltage bias across the first and second bond pads for controllably writing data to the magnetic recording disk; and
   selectively apply a second voltage bias from the first and second bond pads across the read element to the third bond pad during a reading operation of the read element.

10. The method of claim 8, further comprising:
    providing a reader-heater operatively positioned relative to the read element for controlling a fly height of the read element relative to the magnetic recording disk, wherein the reader-heater is electrically coupled to the center tap and is electrically connected between the center tap and a third bond pad.

11. The method of claim 8, further comprising:
    providing a first diode electrically connected between the center tap and the third bond pad, wherein the first diode has a forward bias.

12. The method of claim 11, wherein the first diode is a Zener diode configured to have a first Zener breakdown voltage.

13. The method of claim 11, further comprising:
    providing a second diode electrically connected between the center tap and the first diode, wherein the second diode has a reverse bias.

14. The method of claim 8, further comprising:
    providing a reader-heater electrically coupled between the center tap and a third bond pad;
    wherein the read element is electrically coupled to the base of a transistor, wherein the reader-heater is electrically coupled to a collector of the transistor, and wherein an emitter of the transistor is electrically coupled to a third bond pad.

15. A head slider for use in a disk drive and to be movably positionable relative to a magnetic recording disk, the head slider comprising:
    at least one write element for writing data to the magnetic recording disk, the write element including a writer coil electrically connected between a first bond pad and a second bond pad, wherein the connection between the first bond pad and the second bond pad has a center tap located proximate to a voltage null point;
    at least one contact sensor, the contact sensor electrically connected between the center tap and a third bond pad; and
    wherein the write element and the contact sensor are configured to be selectively activated based on biased inputs to the first bond pad, second bond pad, and third bond pad.

16. The header slider of claim 15, further comprising a first diode having a forward bias electrically connected between the center tap and the third bond pad.

17. The head slider of claim 15, further comprising a reader electrically connected between the center tap and a fourth bond pad.

18. The head slider of claim 17, further comprising a second diode having a forward bias electrically connected between the center tap and the reader.

19. The head slider of claim 15, further comprising a reader-heater electrically connected between the center tap and a fourth bond pad.

20. The head slider of claim 19, further comprising a reverse bias diode electrically connected between the center tap and the reader-heater.

* * * * *